United States Patent [19]

Wilkinson

[11] Patent Number: 5,502,748
[45] Date of Patent: Mar. 26, 1996

[54] DETECTION OF SYNCHRONISATION DATA

[75] Inventor: James H. Wilkinson, Tadley, England

[73] Assignees: Sony Corporation, Tokyo, Japan; Sony United Kingdom Limited, Middlesex, England

[21] Appl. No.: 375,238

[22] Filed: Jan. 19, 1995

Related U.S. Application Data

[63] Continuation of Ser. No. 35,700, Mar. 23, 1993, abandoned.

[30] Foreign Application Priority Data

Jun. 4, 1992 [GB] United Kingdom .................. 9211857

[51] Int. Cl.$^6$ .................................. H04L 7/00; H04J 3/06
[52] U.S. Cl. ...................... 375/354; 375/365; 375/368; 370/105.4
[58] Field of Search .................................. 375/363, 366; 370/106, 108, 106.1

[56] References Cited

U.S. PATENT DOCUMENTS

| | | | |
|---|---|---|---|
| 4,748,623 | 5/1988 | Fujimoto | 375/114 |
| 4,802,192 | 1/1989 | Eto et al. | 375/116 |
| 4,920,546 | 4/1990 | Iguchi et al. | 375/354 |
| 4,984,238 | 1/1991 | Watanabe et al. | 375/114 |
| 5,140,618 | 8/1992 | Kinoshita et al. | 375/116 |
| 5,161,171 | 11/1992 | Suzuki et al. | 375/116 |
| 5,295,163 | 3/1994 | Fehlauer | 375/366 |

*Primary Examiner*—Edward L. Coles, Sr.
*Assistant Examiner*—Madeleine Anh-Vinh Nguyen
*Attorney, Agent, or Firm*—William S. Frommer; Alvin Sinderbrand

[57] ABSTRACT

Apparatus for detecting synchronisation data in an input serial-bit digital signal formed of a series of word blocks each including a predetermined serial group of m bits forming said synchronisation data, comprises a deserialiser for deserialising the input signal to parallel-bit p-bit words where p<m, a delay for delaying at least p-1 bits of each p-bit word by one p-bit word period, and logic for receiving successive groups of 2p-1 bits each formed of a said p-bit word and the adjacent p-1 bits of the preceding or succeeding word. The logic is arranged to detect an initial portion of said synchronisation data by comparing bit sequences in a said group of 2p-1 bits with the bit sequence at the beginning of said predetermined group of m bits. On detection of said initial portion of the synchronisation data, bits of one or more succeeding groups of 2p-1 bits are compared with succeeding bits of said predetermined m bits in dependence upon the position of said initial portion in the corresponding 2p-1 bits. On detection of all m bits of the synchronisation data, a control signal is generated for controlling alignment of the bits of the words of the input signal in parallel form in dependence upon the position of said initial portion of the synchronisation data in the corresponding 2p-1 bits.

17 Claims, 3 Drawing Sheets

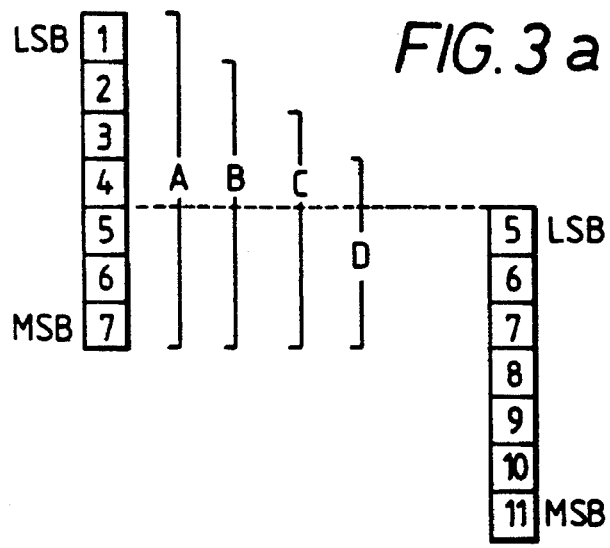
FIG. 3a
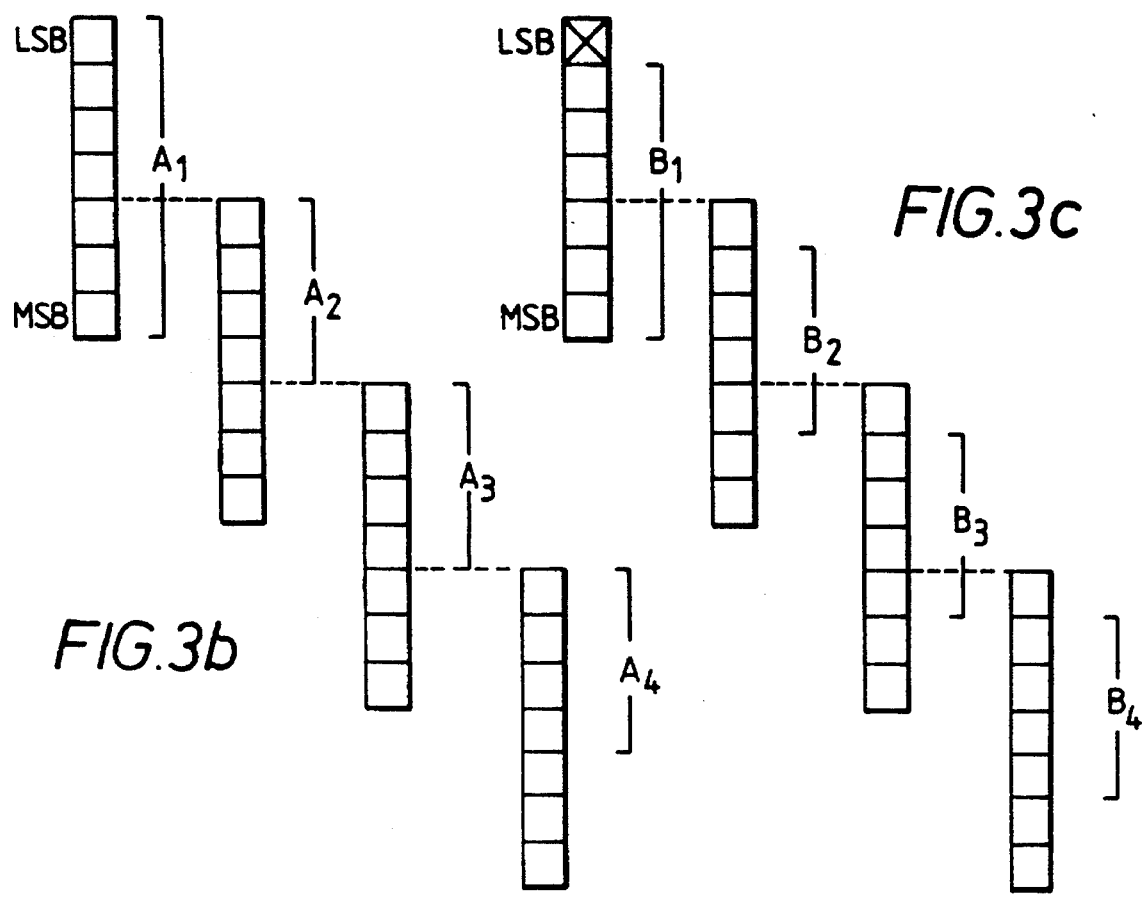
FIG. 3b
FIG. 3c

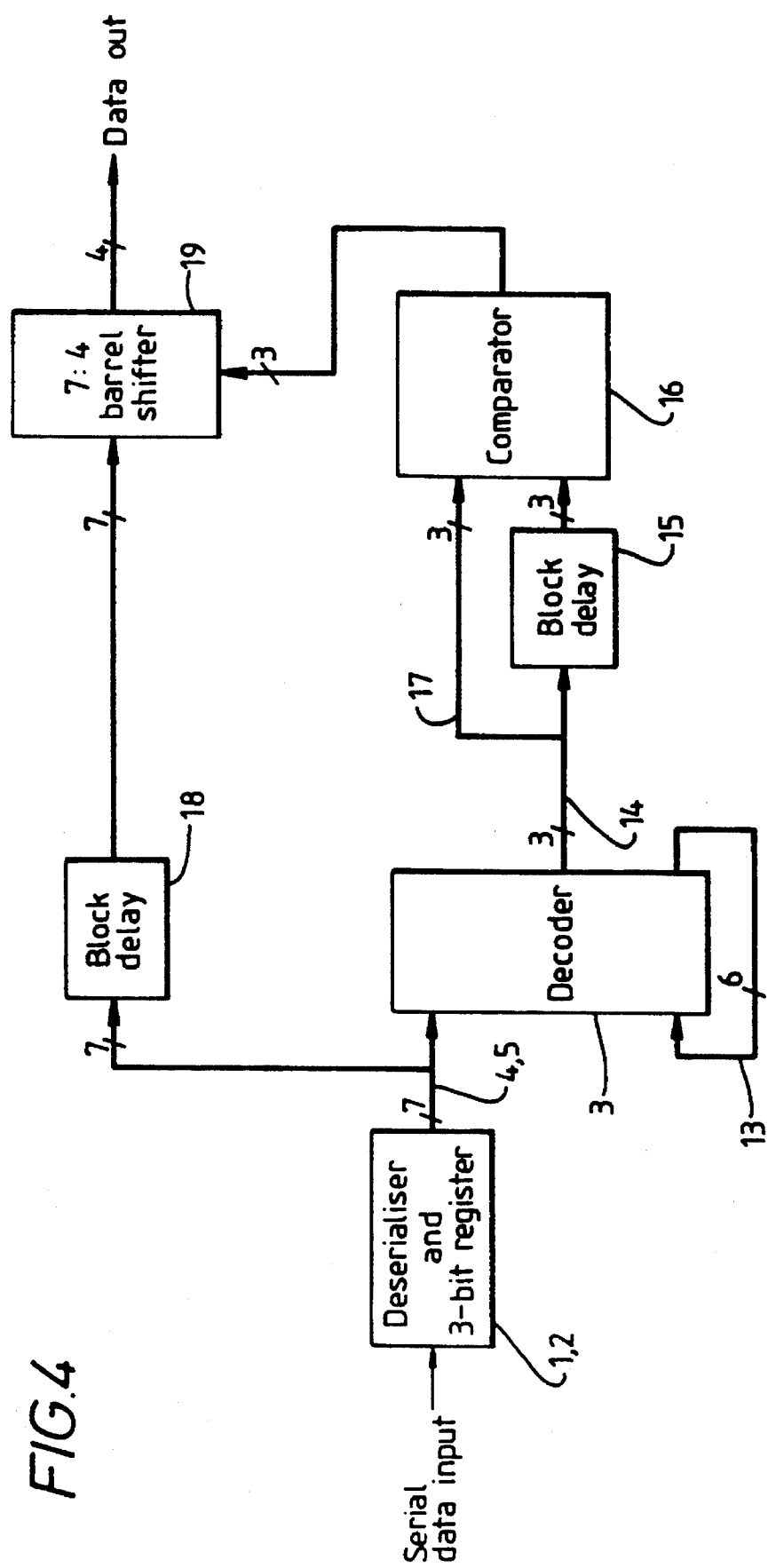

DETECTION OF SYNCHRONISATION DATA

This application is a continuation of application Ser. No. 08/035,700, filed Mar. 23, 1993, abandoned.

BACKGROUND OF THE INVENTION

1. Field of the Invention

This invention relates to detection of synchronisation data in a serial-bit digital signal, and in particular, though not exclusively, to detection of synchronisation data in serial-bit digital video signals on reproduction from a digital video tape recorder (DVTR).

2. Description of the Prior Art

Digital video signals ape recorded by DVTRs as serial-bit data streams comprising video data, error protection information, spare data capacity (which may be used fop example to record items such as dates, times and titles) and synchronisation data. The synchronisation data is crucial to recovering the video data on reproduction of the signals. The recorded serial-bit data stream is generally in the form of blocks of words which must be converted to parallel form on reproduction. The synchronisation data is required to enable identification of the first bit of each word, so as to permit deserialisation, and also to identify the first word of each block of video data words.

Usual methods of detecting, of decoding, synchronisation words are based on detection in a serial force. This is easy to implement provided the off-tape serial data Fate is slow. However, high-speed data requires the use of ECL logic. These methods then become wasteful in hardware in view of the large number of devices required.

One known method of detecting synchronisation data is disclosed in UK patent number 2089178. Here, the reproduced serial data stream is clocked at the serial data Fate through a multi-stage shift register. An output of each stage of the shift register is connected to a NAND gate which generates a pulse when the register holds the synchronisation (sync) word to be detected. Outputs of the shift register are also connected to a latch arrangement fop deserialising the data clocked through the shift register to parallel word form with arbitrary phase, i.e. the first bit of each video data word could be in any one of the bits of a parallel word. Pulses from the NAND gate are clocked through a further shift register the outputs of which are latched at the arbitrary word rate. The latch outputs are converted to binary codes which indicate the phase of the sync data relative to the parallel words produced by the latch arrangements. These codes are then used to control correct realignment of the bits of the parallel words. This system is relatively complex in terms of hardware, and is not easily adaptable to cope with longer sync codes. Furthermore, the system does not easily handle high off-tape serial data rates which in some cases can rise to over 70 MHz in shuttle replay.

SUMMARY OF THE INVENTION

According to the present invention there is provided apparatus for detecting synchronisation data in an input serial-bit digital signal formed of a series of word blocks each including a predetermined serial group of m bits forming said synchronisation data, the apparatus comprising:

a deserialiser for deserialising the input signal to parallel-bit p-bit words where p<m;

a delay for delaying at least p-1 bits of each p-bit word by one p-bit word period; and logic for receiving successive groups of 2p-1 bits each formed of a said p-bit word and the adjacent p-1 bits of the preceding or succeeding word, the logic being arranged:

to detect an initial portion of said synchronisation data by comparing bit sequences in a said group of 2p-1 bits with the bit sequence at the beginning of said predetermined group of m bits;

on detection of said initial portion of the synchronisation data, to compare bits of one or more succeeding groups of 2p-1 bits with succeeding bits of said predetermined m bits in dependence upon the position of said initial portion in the corresponding 2p-1 bits; and on detection of all m bits of the synchronisation data, to generate a control signal for controlling alignment of the bits of the words of the input signal in parallel form in dependence upon the position of said initial portion of the synchronisation data in the corresponding 2p-1 bits.

Thus, the synchronisation data is detected in parallel word form, enabling the data rate to be reduced to well within the capability of CMOS logic. Further, simple detection of long synchronisation codes is possible since each code is detected on a word by word basis. An increase in the length of the synchronisation code to be detected requires only an increase in the number of comparisons which need to be made before the complete code is detected.

The logic receives successive groups of 2p-1 bits, each group comprising a p-bit word and the p-1 bits of a neighbouring word which were adjacent to that p-bit word in the serial input. For example, the delay may be arranged to delay the most significant p-1 bits of each p-bit word by one p-bit word period with respect to that word, and the logic arranged to receive successive groups of 2p-1 bits each formed of a said p-bit word and the delayed p-1 bits of the preceding word. (It is to be understood here that the "most significant" bits of a p-bit word as used herein means those bits of the word which were input last to the deserialiser and does not refer to the significance of the data within the p-bit word.)

The logic is preferably arranged to detect said initial portion of the synchronisation data by comparing bit sequences of at least p bits in length with the bit sequence at the beginning of said predetermined m bits. However, to reduce the possibility of the detection process being initiated by a bit sequence which matches the initial portion of the expected sync code but which is not in fact part of a sync code, it is desirable to compare as much as possible of the group of 2p-1 bits with the corresponding portion of the expected sync code. Thus, it is preferred that the logic is arranged to detect said initial portion of the synchronisation data by comparing bit sequences comprising the most significant p to 2p-1 bits of the group of 2p-1 bits with the bit sequence at the beginning of said predetermined m bits. Thus, the logic may check first whether all 2p-1 bits match the 2p-1 bits at the beginning of the expected sync code. If no match is obtained, the logic then effectively ignores the least significant bit of the input group and checks the most significant 2p-2 input bits against the initial 2p-2 bits of the expected sync code. This checking for the start of a sync code in different positions within the input 2p-1 bits is continued until the most significant p bits of the input group have been checked against the first p bits of the sync code. If at any stage a match is obtained, this fact is registered and the logic waits for the next group of 2p-1 bits to continue the detection process. If the start of a sync code should be within the most significant p bits of the input group, then this will be detected in the next group of 2p-1 bits supplied to the logic.

Upon detection of an initial portion of the expected sync code, the logic need only to compare a p-bit in each said succeeding group of 2p-1 bits with succeeding bits of the predetermined m bits. Which p-bit window in the group of 2p-1 bits is compared with part of the expected sync code depends upon the position of said initial portion of the sync code in the corresponding 2p-1 bits.

In some applications, synchronisation codes may be polarity independent. Thus, the logic is preferably arranged to detect the initial portion of said synchronisation data in either polarity thereof, and to effect the comparison with succeeding bits of the predetermined m bits in dependence upon the polarity of the said initial portion. Thus, once the initial portion of a sync code has been identified in one polarity, succeeding portions of the input signal must match the sync code in the identified polarity for detection to continue.

A particularly advantageous arrangement is achieved where p=4. In this case the off-tape serial data rate is reduced by a factor of 4, which brings the rate well within the capabilities of CMOS logic, while only 7 parallel bits of the input signal need to be supplied to the logic. In addition, in this case each doubling in the length of the sync code to be detected can be handled in a particularly simple manner as is described below.

A further advantage of the invention is that it is possible to implement error detection during the decoding process. While it is generally preferable to reject a good sync code than to identify a sync code incorrectly, a one-bit error in a sync code may be acceptable, in particular when a high error rate is expected for some reason. Thus, the logic may be arranged to detect succeeding bits of the predetermined m bits in spite of a one bit discrepancy in only one of said succeeding groups of 2p-1 bits. For example, in this case, if there is an error in the initial portion of the sync code, the code will not be detected. A 1-bit error in any one of the p-bit sequences in succeeding groups of 2p-1 bits compared with the predetermined m bits is allowed, but after detection of such an error, the p-bit sequences of all further groups of 2p-1 bits compared with the expected sync code must be correct for the sync code to be successfully detected.

The invention also provides a method of detecting synchronisation data in an input serial-bit digital signal formed of a series of word blocks each including a predetermined serial group of m bits forming said synchronisation data, the method comprising:

deserialising the input signal to parallel-bit p-bit words where p<m;

delaying at least p-1 bits of each p-bit word by one p-bit word-period;

processing successive groups of 2p-1 bits each formed of a said p-bit word and the adjacent p-1 bits of the preceding or succeeding word, the processing operation comprising detecting an initial portion of said synchronisation data by comparing bit sequences in a said group of 2p-1 bits with the bit sequence at the beginning of said predetermined group of m bits, and on detection of said initial portion, comparing bits of one or more succeeding groups of 2p-1 bits with succeeding bits of said predetermined m bits in dependence upon the position of said initial portion in the corresponding 2p-1 bits; and on detection of all m bits of the synchronisation data, generating a control signal for controlling alignment of the bits of the words of the input signal in parallel form in dependence upon the position of said initial portion of the synchronisation data in the corresponding 2p-1 bits.

The method may be carried out using apparatus as hereinbefore described. In general, where features are described herein with reference to an apparatus in accordance with the invention, corresponding features may be provided in a method of the invention and vice versa.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3a, 3b and 3c are schematic diagrams illustrating the operation of the apparatus of FIG. 2; and FIG. 4 shows apparatus for deserialising a reproduced digital video signal to parallel word form which incorporates the apparatus of FIG. 2.

DESCRIPTION OF THE PREFERRED EMBODIMENTS

Figure 1:
FIG. 1 is an example of the format in which data is recorded on a magnetic tape.

FIG. 1 shows an example of the format used in recording the data representing a composite coded video signal on the magnetic tape of a DVTR. The data is made up of successive blocks of 64 16-bit words. If these words are numbered 1 to 64, words 1 and 2 correspond to synchronisation data, and words 5 to 64 contain address data, video data and error correction data to enable correction of errors in the reproduced data in the reproduction processor.

Figure 2:
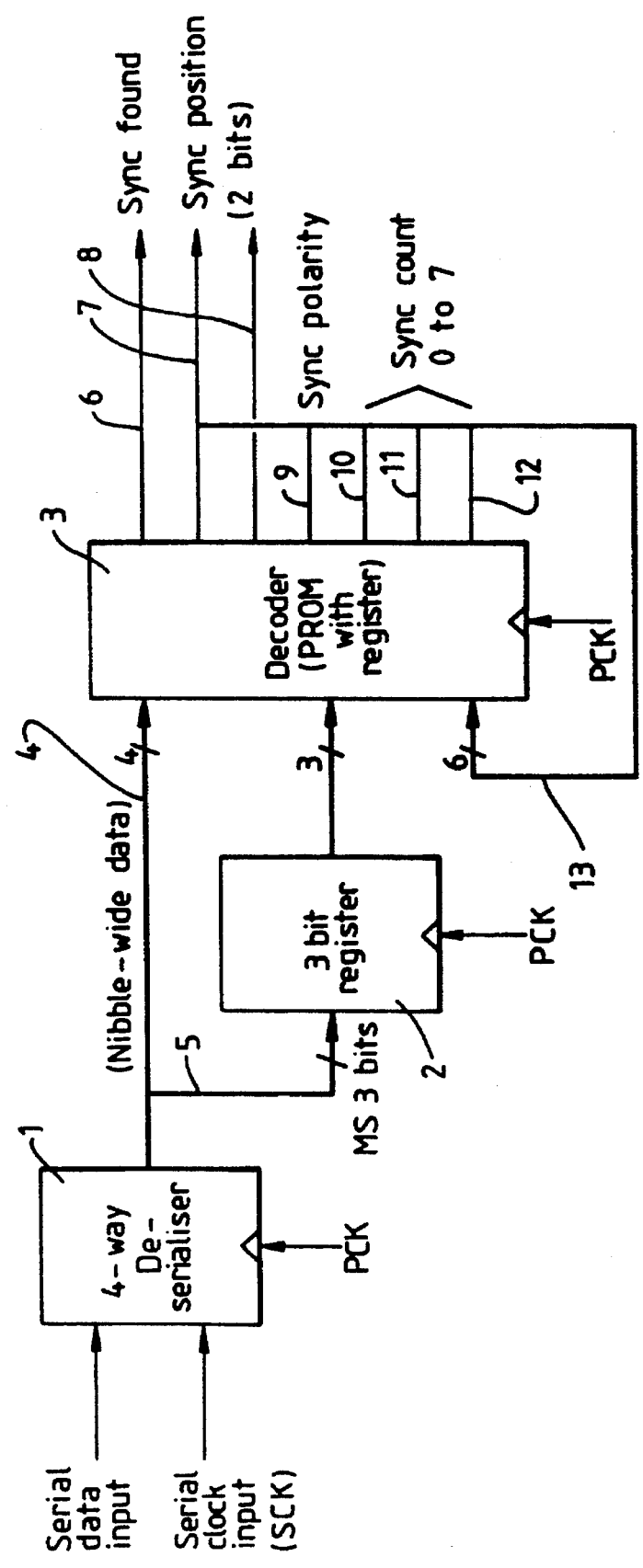
FIG. 2 shows apparatus for detecting synchronisation data embodying the invention.

FIG. 2 shows apparatus embodying the invention for detecting synchronisation data. The apparatus comprises a 4-way deserialiser 1, a 3-bit register 2 and a decoder 5. The decoder 3 is in the form of a state machine comprising, in this example, a PROM and a register so that outputs of the decoder can be fed back to its inputs. A 4-bit bus 4 connects the deserialiser 1 and the decoder 3, and the 3-bit register 2 is connected in a 3-bit bus 5 between the bus 4 and the decoder 3. The state machine decoder 3 has seven 1-bit outputs which are numbered 6 to 12 in the figure. The outputs 7 to 12 are fed back to the inputs of the state machine via a 6-bit bus 13.

In operation, the serial-bit data stream reproduced by the DVTR is clocked into the deserialiser 1 by a serial clock (SCK) at the serial bit rate. The deserialiser 1 converts the serial input data to parallel-bit 4-bit words which are clocked along the data bus 4 by an arbitrary phase parallel clock (PCK) at one quarter of the rate of the serial bit input. The most significant (MS) 3 bits of the 4-bit data on the bus 4 are passed along the 5-bit bus 5 to the 5-bit register 2 from where they are supplied to the decoder 3 on the next parallel clock pulse. Thus, on the second and subsequent clock pulses, 7 contiguous bits are supplied to the inputs of the decoder 3.

As previously indicated, the three "most significant" bits of a 4-bit word in this context means the three bits of the 4-bit word which were input last to the deserialiser 1 and does not refer to the significance of the data within the 4-bit words.

The 32 bits of the sync code to be detected are stored in the PROM of the decoder 3. For each group of seven parallel bits supplied to the decoder on a parallel clock pulse, the decoder 3 compares bit sequences within the seven input bits with an initial portion of the expected sync code stored in the PROM as will now be described with reference to FIG. 3a.

Two successive groups of seven bits supplied to the decoder 3 are shown schematically in FIG. 3a which indicates the relationship between the bits, numbered 1 to 11, in the two groups. When the first group is supplied to the decoder 3, the decoder first compares all seven bits with the first seven bits of the expected sync code as indicated by the bracket A in the figure. If no match is obtained for either polarity of the sync code (the decoder will detect an initial portion of the sync code in the incoming data in either polarity of the sync code), the decoder effectively ignores the least significant bit, bit 1, and compares the most significant six bits of the group with the first six bits of the expected sync code as indicated by the bracket B. If no match is obtained, the decoder then performs the comparison indicated by the bracket C and, if there is still no match, the most significant four bits are compared with the first four bits of the sync code as shown by bracket D. Thus, the decoder checks for a sync code in either polarity starting in one of four positions in the input group, i.e. starting with bit 1, 2, 3 or 4. If the initial portion of a sync code is not detected in any of these positions the decoder waits for the next input group. It will be seen from the figure that a sync code starting within the most significant four bits of the first group, i.e. starting with bits 5, 6 or 7, will be detected by the same process performed on the next input group.

This process is repeated by the decoder 3 for each subsequent group of seven bits supplied as inputs until an initial portion of a sync code is successfully detected in the incoming data.

It will be appreciated that there are certain constraints on the choice of sync patterns with which the apparatus is operable. In particular, the first four bits of the sync code must be such that they are distinguishable from all other possible 4-bit sequences in the same code in both polarities. However, this has not proved to be any real obstacle to sync word choice in practice.

On successful detection of the first four to seven bits of a sync code in the incoming data, the decoder 3 sets the output 9 to indicate the polarity of the detected portion of the sync code. The two 1-bit outputs 7 and 8 of the state machine are set to indicate the position, between 0 and 3, of the detected portion of the sync code within the corresponding seven input bits. The three 1-bit outputs 10, 11 and 12 of the decoder register a count, between 0 and 7, to indicate which of the eight 4-bit portions of the 32 bit sync code is expected in the next 7-bit input to the decoder. Thus, the sync count is initially zero and is set to 1 on successful detection of the initial portion of a sync code.

The outputs 7 to 12 are fed back to the decoder inputs by the 6-bit bus 13. With the count value now at 1, the decoder 3 is expecting the next 7-bit input to contain the second 4-bit section of the sync code of a polarity determined by the state of the output 9 and in a position determined by the detected position of the initial portion of the sync code as determined by the state of the outputs 7 and 8. FIGS. 3b and 3c show four successive groups of seven input bits to illustrate the continued detection process. FIG. 3b illustrates the case where a sync code starting with the LSB of a first 7-bit group has been detected so that all seven bits of this group match the first seven bits of the expected sync code as indicated by the bracket $A_1$. The second 4-bit portion of the sync code is thus expected to start in the LSB position of the next 7-bit input, so the decoder compares the least significant four bits of the next group with the second 4-bit portion of the sync code as indicated by the bracket $A_2$. Similarly, assuming the comparisons are favourable, the decoder expects the third and fourth 4-bit portions of the sync code in the positions indicated by the brackets $A_3$ and $A_4$ in the following 7-bit inputs. Each time a new 4-bit portion of the sync code is detected, the count value on inputs 10 to 12 of the decoder is incremented by 1, the sync polarity output 9 is held, and the sync position outputs 7, 8 are held since the position of the next expected 4-bit portion in the corresponding input bits is the same as that of the initial portion of the sync code.

FIG. 3c illustrates the case where the initial portion of a sync code is detected in the position indicated by the bracket $B_1$, so that subsequent 4-bit portions of the code are expected in the positions shown by the brackets $B_2$, $B_3$, $B_4$ etc in the following 7-bit inputs.

The above described process continues until all 32 bits of the sync code have been successfully detected by the decoder 3, the sync count being incremented by 1 each time a new 4-bit portion of the sync code is detected. On successful detection of all 32 bits of the code, after 8 parallel clock cycles, the sync found output 6 of the decoder is set to indicate successful detection. The sync found bit together with the sync position bits on the outputs 7 and 8 form a control signal which can be used to correctly align the reproduced data into parallel words for further processing.

If at any stage in the detection process the input bits do not correspond to the expected 4-bit portion of the sync code, then the outputs of the decoder 3 are reset and the process starts again with the decoder 3 waiting for the initial portion of a sync code in the next seven bits supplied to it. Thus, while the parallel detection process might be initiated by a number of input signals which may naturally occur in the data, detection is only continued if subsequent groups of seven bits supplied to the decoder contain the expected 4-bit portion of the sync code in the correct position and of the correct polarity.

It will be appreciated that the apparatus of FIG. 2 can be readily applied to the detection of longer sync codes, since each doubling of the sync code length requires only a 1-bit increase in the sync count output of the decoder 3.

It is also possible to implement error detection, for example in the event of a high error rate in the input serial-bit data. For example, a further 1-bit output (not shown) of the state machine 3 may be used as an error flag, this output being fed back to the state machine inputs by the (then 7-bit) bus 13. The initial portion of the sync code in a 7-bit input to the decoder 3 must be correct for successful detection by the decoder. However, if the appropriate 4-bit portion of any succeeding 7-bit input matches the expected portion of the sync code apart from a 1-bit error, this will be detected as a portion of the sync code but the error flag output will be set to indicate that the input contained an error. Thus, the sync code output will be incremented by 1 just as though the input precisely matched the expected portion of the sync code, and the decoder 3 will expect the next 4-bit portion of the sync code in the next 7-bit input. However, the error flag is fed back via the bus 13 to the decoder inputs and is used to constrain the appropriate 4-bit portion in all subsequent 7-bit inputs to be an exact match with the expected portion of the sync code for successful detection to occur. In this way, sync codes in the incoming data are detected in spite of a 1-bit discrepancy with the expected sync code.

FIG. 4 is a block diagram of apparatus for aligning the serial input data in parallel word form which includes the apparatus of FIG. 2. In FIG. 4, the deserialiser 1 and 3-bit register 2 of FIG. 2 are shown as a single block for clarity. Similarly, the 4-bit bus 4 and 3-bit bus 5 in FIG. 4 are shown as a single 7-bit bus in FIG. 3. The output of the decoder 3 in FIG. 4 is shown as a 3-bit bus 14 which consists of the 1-bit outputs 6, 7 and 8 of FIG. 2. The 3-bit bus 14 connects the decoder 3 to a block delay 15 which delays the 3-bit data by an interval corresponding to one word block (FIG. 1), i.e. the interval between adjacent sync codes in the input data. The output of the block delay 15 is connected to a comparator 16 which also receives the 3-bit output of the decoder 3 directly via a 3-bit bus 17 which bypasses the block delay 15.

The parallel-bit 7-bit data on the buses 4, 5 is also supplied to a further block delay 18 which, like the block delay 15, delays the input data by the period of one word block. The delayed data is then supplied to a 7:4 barrel shifter 19 which also receives the output of the comparator 16 and generates a 4-bit output.

In operation, when a sync code is successfully detected by the decoder 3, a control signal is output on the bus 14, the control signal comprising the sync found bit and the sync position bits on the outputs 6, 7 and 8 of FIG. 2 as previously described. After being delayed by the block delay 15, the 3-bit control signal is supplied to the comparator 16. At this point, the succeeding sync code should have been detected by the decoder 3 and a further control signal supplied directly to the comparator 16 via the bus 17. If two succeeding sync codes have been correctly detected by the decoder 3 then the two control signals supplied to the comparator 16 should be identical, i.e. the sync position bits should be the same in each case. If the inputs to the comparator 16 are identical, then the 3-bit control signal is output to the barrel shifter 19. This control signal indicates the position of the start of the sync signal in the 7-bit input to the barrel shifter which has been appropriately delayed by the block delay 18. The barrel shifter 19 then outputs the first 4 bits of the sync code selected from the 7 input bits in dependence upon the control signal. Thereafter, the barrel shifter continues to select the corresponding four bits from each 7-bit input. Thus, the start of each 16-bit video data word will correspond to the first bit of a 4-bit output of the barrel shifter 19. The output of the barrel shifter 19 is supplied to a timebase corrector (not shown) where the now correctly aligned data is temporarily stored.

If at any time the decoder 3 fails to detect an expected sync code, or the control signals supplied to the comparator 3 do not match, then the barrel shifter 19 continues to select four bits from each 7-bit input in dependence upon the last control signal supplied thereto until a new control signal is supplied by the comparator 16.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for detecting synchronization data in an input serial-bit digital signal formed of a series of word blocks each including a predetermined serial group of m bits forming said synchronization data, the apparatus comprising:

a deserialiser for deserialising the input signal to form parallel-bit p-bit words where p<m;

a delay for receiving only p-1 bits of each p-bit word from said deserialiser and for delaying only the received p-1 bits by one p-bit word period; and logic means coupled to said deserialiser and said delay for receiving one of said p-bit words from said deserialiser and for receiving delayed p-1 bits which are adjacent to the received p-bit word in a preceding or succeeding word from said delay so as to form successive groups of 2p-1 bits, the logic means being arranged:

to detect an initial portion of said synchronization data by comparing bit sequences in one of said groups of 2p-1 bits with the bit sequence at the beginning of said predetermined group of m bits;

on detection of said initial portion of the synchronization data, to compare bits of one or more succeeding groups of 2p-1 bits with succeeding bits of said predetermined m bits in dependence upon the position of said initial portion in the corresponding 2p-1 bits; and on detection of all m bits of the synchronization data, to generate a control signal for controlling alignment of the bits of the words of the input signal in parallel form in dependence upon the position of said initial portion of the synchronization data in the corresponding 2p-1 bits.

2. Apparatus as claimed in claim 1, wherein the delay is arranged to delay the most significant p-1 bits of each p-bit word by one p-bit word period with respect to that word, and the logic means is arranged to receive successive groups of 2p-1 bits each formed of one of said p-bit words and the delayed p-1 bits of the preceding word.

3. Apparatus as claimed in claim 1, wherein the logic means is arranged to detect said initial portion of the synchronisation data by comparing bit sequences of at least p bits in length with the bit sequence at the beginning of said predetermined m bits.

4. Apparatus as claimed in claim 3, wherein the logic means is arranged to detect said initial portion of the synchronisation data by comparing bit sequences comprising the most significant p to 2p-1 bits of the group of 2p-1 bits with the bit sequence at the beginning of said predetermined m bits.

5. Apparatus as claimed in claim 1, wherein the logic means is arranged to compare a p-bit sequence in each said succeeding group of 2p-1 bits with succeeding bits of the predetermined m bits in dependence upon the position of said initial portion of the synchronisation data in the corresponding 2p-1 bits.

6. Apparatus as claimed in claim 1, wherein the logic means is arranged to detect the said initial portion of the synchronisation data in either polarity thereof and to effect the comparison with succeeding bits of the predetermined m bits in dependence upon the polarity of the said initial portion.

7. Apparatus as claimed in claim 1, further comprising means for enabling the logic means to detect succeeding bits of the synchronization data after detection of said initial portion of the synchronization data in spite of a 1-bit discrepancy in only one of said succeeding groups of 2p-1 bits.

8. Apparatus as claimed in claim 1, wherein p=4.

9. A method of detecting synchronization data in an input serial-bit digital signal formed of a series of word blocks each including a predetermined serial group of m bits forming said synchronization data, the method comprising:

deserialising the input signal to form parallel-bit p-bit words where p<m;

delaying only p-1 bits of each p-bit word by one p-bit word period; and receiving one of said p-bit words and the delayed p-1 bits which are adjacent to the received p-bit word in a preceding or succeeding word so as to form successive groups of 2p-1 bits and processing said successive groups of 2p-1 bits in which the processing operation includes detecting an initial portion of said synchronization data by comparing bit sequences in one of said groups of 2p-1 bits with the bit sequence at the beginning of said predetermined group of m bits, and on detection of said initial portion, comparing bits of one or more succeeding groups of 2p-1 bits with succeeding bits of said predetermined m bits in dependence upon the position of said initial portion in the corresponding 2p-1 bits; and on detection of all m bits of the synchronization data, generating a control signal for controlling alignment of the bits of the words of the input signal in parallel form in dependence upon the position of said initial portion of the synchronization data in the corresponding 2p-1 bits.

10. A method as claimed in claim 9, comprising delaying the most significant p-1 bits of each p-bit word by one p-bit word period with respect to that word, and processing successive groups of 2p-1 bits each formed of one of said p-bit words and the delayed p-1 bits of the preceding word.

11. A method as claimed in claim 9, the method comprising detecting said initial portion of the synchronisation data by comparing bit sequences of at least p bits in length with the bit sequence at the beginning of said predetermined m bits.

12. A method as claimed in claim 11, the method comprising detecting said initial portion of the synchronisation data by comparing bit sequences comprising the most significant p to 2p-1 bits of the group of 2p-1 bits with the bit sequence at the beginning of said predetermined m bits.

13. A method as claimed in claim 9, the method comprising comparing a p-bit sequence in each said succeeding group of 2p-1 bits with succeeding bits of the predetermined m bits in dependence upon the position of said initial portion of the synchronisation data in the corresponding 2p-1 bits.

14. A method as claimed in claim 9, the method comprising detecting the said initial portion of said synchronisation data in either polarity thereof and effecting the comparison with succeeding bits of the predetermined m bits in dependence upon the polarity of the said initial portion.

15. A method as claimed in claim 9, the method comprising detecting succeeding bits of the synchronization data after detection of said initial portion of the synchronization data in spite of a 1-bit discrepancy in only one of said succeeding groups of 2p-1 bits.

16. A method as claimed in claim 9, wherein p=4.

17. Apparatus for detecting synchronization data in an input serial-bit digital signal formed of a series of blocks each having a plurality of words in which each word has m bits, each said series of blocks having two of said words including a predetermined serial group of 2 m bits forming said synchronization data, the apparatus comprising:

a deserialiser for deserialising the input signal to form parallel-bit p-bit words where p<m;

a delay for receiving only p-1 bits of each p-bit word from said deserializer and for delaying only the received p-1 bits by one p-bit word period; and logic means for receiving one of said p-bit words obtained directly from said deserialiser and for receiving delayed p-1 bits which are adjacent to the received p-bit word in a preceding word obtained from said delay so as to form successive groups of 2p-1 bits, the logic means being adapted to detect an initial portion of said synchronisation data by comparing bit sequences in one of said groups of 2p-1 bits with the bit sequence at the beginning of said predetermined group of m bits; on detection of said initial portion of the synchronisation data, to compare bits of one or more succeeding groups of 2p-1 bits with succeeding bits of said predetermined m bits in dependence upon the position of said initial portion in the corresponding 2p-1 bits; and on detection of all m bits of the synchronisation data, to generate a control signal for controlling alignment of the bits of the words of the input signal in parallel form in dependence upon the position of said initial portion of the synchronisation data in the corresponding 2p-1 bits.

* * * * *